United States Patent [19]
Varma et al.

[11] Patent Number: 5,959,993
[45] Date of Patent: Sep. 28, 1999

[54] SCHEDULER DESIGN FOR ATM SWITCHES, AND ITS IMPLEMENTATION IN A DISTRIBUTED SHARED MEMORY ARCHITECTURE

[75] Inventors: Subir Varma, San Jose; Thomas Daniel, Los Altos Hills, both of Calif.

[73] Assignee: LSI Logic Corporation, Milpitas, Calif.

[21] Appl. No.: 08/714,005

[22] Filed: Sep. 13, 1996

[51] Int. Cl.⁶ .................................................. H04J 3/00
[52] U.S. Cl. ............................................ 370/397; 370/416
[58] Field of Search ..................................... 370/389, 397, 370/412, 428, 413–418, 445, 229, 230, 235, 351, 352, 395, 396, 399, 400, 411, 409, 419, 444, 455, 468; 340/825.5, 825.51, 825.52

[56] References Cited

U.S. PATENT DOCUMENTS

| | | |
|---|---|---|
| 4,306,286 | 12/1981 | Cocke et al. . |
| 4,484,292 | 11/1984 | Hong et al. . |
| 4,947,388 | 8/1990 | Kuwahara et al. . |
| 4,956,839 | 9/1990 | Torii et al. . |
| 5,062,106 | 10/1991 | Yamazaki et al. . |
| 5,079,762 | 1/1992 | Tanabe . |
| 5,130,975 | 7/1992 | Akata . |
| 5,130,977 | 7/1992 | May et al. . |
| 5,130,984 | 7/1992 | Cisneros . |
| 5,136,584 | 8/1992 | Hedlund . |
| 5,140,583 | 8/1992 | May et al. . |
| 5,153,920 | 10/1992 | Danner . |
| 5,166,926 | 11/1992 | Cisneros et al. . |
| 5,173,897 | 12/1992 | Schrodi et al. . |
| 5,189,666 | 2/1993 | Kagawa . |
| 5,189,668 | 2/1993 | Takatori et al. . |
| 5,204,857 | 4/1993 | Obara . |
| 5,214,642 | 5/1993 | Kunimoto et al. . |
| 5,216,669 | 6/1993 | Hoffstetter et al. . |
| 5,220,563 | 6/1993 | Grenot et al. . |
| 5,222,085 | 6/1993 | Newman . |
| 5,229,991 | 7/1993 | Turner . |
| 5,247,516 | 9/1993 | Bernstein et al. . |
| 5,274,768 | 12/1993 | Traw et al. . |
| 5,329,623 | 7/1994 | Smith et al. . |
| 5,412,655 | 5/1995 | Yamada et al. . |
| 5,440,523 | 8/1995 | Joffe . |
| 5,533,020 | 7/1996 | Byrn et al. . |
| 5,548,587 | 8/1996 | Bailey et al. . |
| 5,548,588 | 8/1996 | Ganmukhi et al. . |
| 5,557,607 | 9/1996 | Holden .................................... 370/413 |
| 5,748,614 | 5/1998 | Wallmeier .............................. 370/412 |

*Primary Examiner*—Dang Ton
*Attorney, Agent, or Firm*—Oppenheimer Wolff & Donnelly LLP

[57] ABSTRACT

A cell scheduler for a distributed shared memory switch architecture including a controller for scheduling transmissions of cells from output queues of the switch structure pursuant to one of several different scheduling modes. The controller receives a mode selection input, segregates the output queues into groups, assigns priority rankings to the groups, and applies one of scheduling disciplines at each group of output queues as determined by the mode selection input and the priority rankings. The groups of output queues include a group of per-Virtual Channel (VC) queues and at least one group of First In-First Out (FIFO) queues. The scheduling disciplines include a Weighted Fair Queuing (WFQ) scheduling discipline applied by the controller at the group of per-VC queues and a Round Robin (RR) scheduling discipline applied by the controller at the at least one group of FIFO queues. The priority rankings comprising a highest priority ranking which is assigned to the group of per-VC queues.

21 Claims, 3 Drawing Sheets

FIG. 3

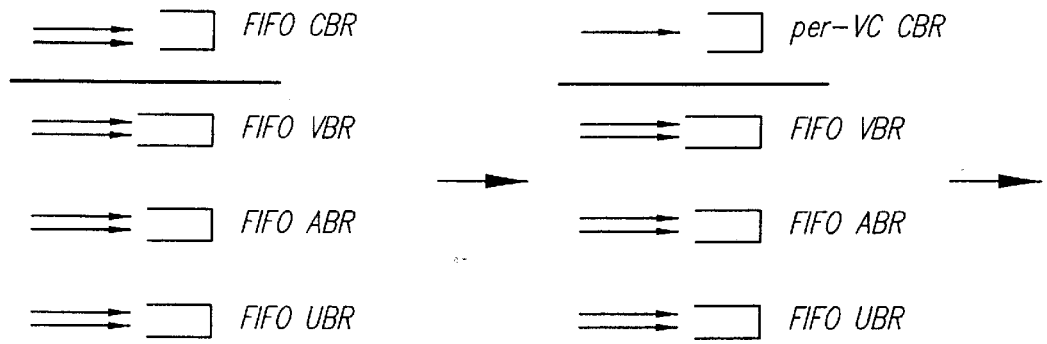

STAGE 1: LEGACY SYSTEM WITH STRICT PRIORITY CLASSES

STAGE 2: per-VC QUEUEING FOR CBR WITH FFQ – MAKES POSSIBLE EXPLICIT DELAY GUARANTEES FOR CBR VCs

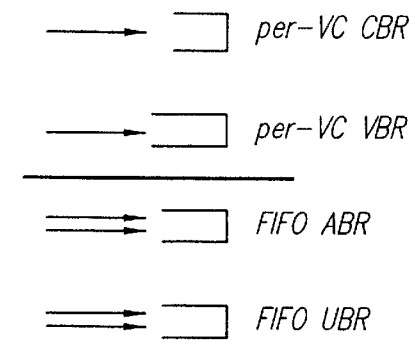

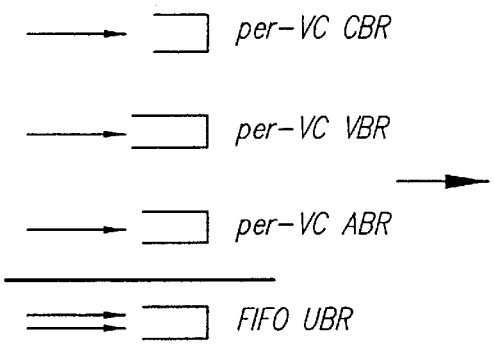

STAGE 3: per – VC QUEUEING FOR VBR WITH FFQ – MAKES POSSIBLE EXPLICIT DELAY GUARANTEES FOR REAL – TIME VBR SOURCES STAGE 4: per-VC QUEUEING ABR WITH FFQ – MAKES POSSIBLE EXPLICIT RATE ABR WITH MCR GUARANTEE

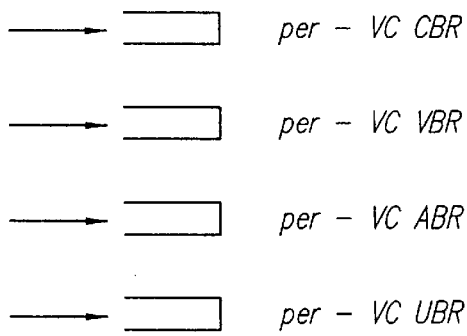

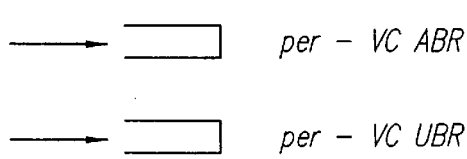

STAGE 5: per – VC QUEUEING FOR UBR WITH FFQ – BETTER SUPPORT FOR UBR, PREVENTS STARVATION

SCHEDULER DESIGN FOR ATM SWITCHES, AND ITS IMPLEMENTATION IN A DISTRIBUTED SHARED MEMORY ARCHITECTURE

BACKGROUND OF THE INVENTION

1. Field of the Invention

The present invention relates to a cell scheduler and, more particularly, pertains to a cell scheduler which supports a variety of scheduling schemes or disciplines and its implementation in a distributed shared memory architecture.

2. Description of the Related Art

With the completion of the ATM (Asynchronous Transfer Mode) Forum Traffic Management 4.0 Specification published February, 1996, by The ATM Forum, Worldwide Headquarters, 2570 West El Camino Real, Suite 304, Mountain View, Calif. 94040-1313, several new traffic management enhancements have become possible in ATM networks. Previous generation of ATM switches were not designed to take advantage of these enhancements, and hence their incorporation requires a new generation of ATM switch architecture and scheduler designs. The purpose of this invention is to describe a new scheduler design that maintains continuity with the previous generation of traffic management techniques, and at the same time makes possible the exploitation of the advanced capabilities found in the ATM Forum Traffic Management 4.0 specification.

Prior art cell scheduling methodologies fall into the following categories:

1. There is provision for four service classes, constant bit rate (CBR), variable bit rate (VBR), available bit rate (ABR) and unspecified bit rate (UBR), at each output link and First-in First-out (FIFO) queuing is used internally within each service class. Virtual channels (VC) belonging to the CBR service class are given the highest priority, followed by those of VBR, ABR and finally UBR.

2. As in 1), there is provision for four service classes at each output link with CBR given the highest priority and UBR the lowest, but instead of FIFO queuing, per-VC queuing is used. Furthermore, the VCs within each priority group are served using the Round-Robin (RR) service discipline.

3. As in 1) there are four service classes at each output link and FIFO queuing is used internally within each class. However, instead of priority scheduling, a Weighted Round Robin (WRR) based scheduler is used to serve these classes.

Using plain priority classes as in 1), it is not possible to provide bandwidth or delay guarantees to individual VCs. Moreover, fairness between VCs for ABR and UBR connections is also not possible. If per-VC queuing is used, as in 2), then it solves the fairness problem, but however it is still not possible to guarantee BW or delay. The provision for WRR in 3) solves the bandwidth allocation problem between service classes, but not within any one service class.

The following section provides an overview of how the different ATM Traffic Classes are supported by the scheduler of the present invention. The ATM traffic classes include: CBR sources, Real-Time VBR sources, Non Real-Time VBR sources, ABR sources and UBR sources.

There is a need for a scheduler, an instance of which resides in each output port, that is able to simultaneously satisfy the Quality of Service (QoS) performance requirements of these traffic classes. The Weighted Fair Queuing algorithm (WFQ) in combination with per-VC queuing can be used to explicitly reserve link bandwidth(BW) for classes which require it, such as CBR, VBR and ABR with MCR support. In addition, it also leads to guaranteed upper bounds for scheduling delay, which is very important for providing real time services over ATM networks.

Furthermore, it is desirable to provide a scheduler which supports the following features:

1. Support for both per-VC queuing as well as plain FIFO queuing.

Per-VC queuing should clearly be supported so that it can be used in conjunction with WFQ to provide explicit BW and delay guarantees to CBR, real-time VBR and ER based ABR sources. In addition, FIFO queuing should be supported for some traffic classes:

- FIFO queuing aggregates several VCs together, hence it reduces the requirements on the control memory to store extra queue pointers and other control data structures.
- Non-real time VBR sources do not require explicit delay guarantees. Hence several of these sources may share a single FIFO buffer, whose size may be chosen according to the cell loss requirements of these streams. This FIFO can be granted the aggregate BW of all its constituent VCs.
- There may be customers who would prefer to do plain FIFO queuing for CBR sources.
- It may be possible to support non-ER ABR sources and UBR sources by means of per-VC accounting, rather than full-blown per-VC queuing.
- Ease migration from present switches that only have FIFO queuing.

2. Support for a very flexible mix of priorities and bandwidth partitioning based scheduling.

Present generation ATM switches rely solely on the priority mechanism to segregate different traffic classes from each other. In these schemes CBR is given the highest priority, followed by VBR, ABR and UBR. The main problem with this scheme is that it is no longer possible to give delay guarantees to lower priority classes (for e.g. rt-VBR).

The presence of the WFQ scheduler provides a more powerful mechanism to segregate traffic classes from each other, without the drawback mentioned above. This is due to the fact that WFQ builds firewalls between competing flows, and also allows redistribution of un-used BW among active flows. One alternative for implementing the scheduler is to rely exclusively on WFQ to segregate traffic classes. Each traffic class will have an upper and lower bound on the BW that it can get. The BW given to CBR and VBR sources cannot be taken away while the connections are still active, however the BW given to ABR and UBR sources may decrease during the course of a connection (if new CBR or VBR connections come up, for instance). These sources then adjust to the decreased BW by means of explicit feedback mechanisms.

The main problem with relying only on WFQ to segregate traffic classes is that, the network explicitly needs to assign upper and lower bounds to the bandwidth that any single class can acquire. This may be a burden especially for larger networks.

With regard to implementation of the scheduler design of the present invention in a distributed shared memory architecture, the following technical hurdles must be addressed in designing and selecting an appropriate switch fabric:

Memory speeds: As the size and the speed of the switch fabric increases, it leads to the requirement for faster and faster memories. Since memory speeds are restricted by the current technology, this necessarily restricts the size of the switch fabric.

Interconnect speeds: For larger fabrics the speed of the interconnects between adjoining switching modules is crucial. Speed-up achievable by using wider buses and faster clocks is restricted by physical limitations, which also restricts the size of the fabric.

Switch control and traffic management: A switch fabric is useless unless it can provide support for sophisticated traffic management functions. This also restricts the types of fabrics that are possible, since an otherwise excellent fabric may not be able to satisfy this requirement.

Support for multicast: This function is extremely important, especially for network control and multimedia applications.

Existing switch fabrics designs fall into the following classes:

Pure output buffered fabrics: These do not scale since the speed of the memory in each output port increases linearly with the number of ports.

Pure input buffered fabrics: These fabrics offer the possibility of scaling up without increasing the speed of the memory located in the input port. However they lead to complexity of the arbitration mechanism required to overcome head-of-line blocking. More importantly, there are no good solutions to doing scheduling for and reserving BW in these fabrics. Multicasting is also a problem.

Shared memory/shared bus fabrics: These represent the most commonly found fabric in commercially available switches. These fabrics do not scale very easily beyond speeds of 20 Gbps due to limitations in speeds of memory modules.

Distributed shared memory fabrics: These fabrics seek to scale up to inter-connecting shared memory modules of size n*n in a square pattern. Thus they are able to scale up without increasing the speed of the memory, however traffic management becomes a problem as the number of modules increases. Also the number of switching elements required increases rapidly with the number of ports.

Multistage interconnection networks: These seek to build a larger fabric by combining modules of a fixed size, say 2*2, in an interconnection pattern. These networks are able to scale up without increasing the speed of the memory or the interconnects. However, as in the case of the input buffered fabric, traffic management and multicasting are difficult to support in these fabrics. The main reason for this is that these architectures lead to queuing inside the fabric itself.

Accordingly, an object of the present invention is to provide a scheduler which supports a mixture of per-VC and FIFO queuing.

Another object is to provide a design for such a scheduler and its implementation in a distributed shared memory switch architecture.

Another object is to provide an improvement to the traditional distributed shared memory switch fabric for such a scheduler making it possible, by virtue of these improvements, to build much larger switch fabrics as compared to the traditional distributed shared memory fabric, using lower speed memories and a smaller number of switch modules.

Another object is to provide a shared memory fabric architecture for high speed ATM switches which resolves the problems of memory and interconnect scalability, i.e., it can scale up to very high speeds using fixed memory and interconnect speeds, while at the same time providing excellent support for traffic management and multi-casting.

Yet another object is to provide a set of integrated circuit chips for implementing the switching fabric and the input/output ports belonging to that fabric.

SUMMARY OF THE INVENTION

In accordance with a specific illustrative embodiment of the present invention, a cell scheduler for a distributed shared memory switch architecture, includes a controller for scheduling transmissions of cells from output queues of the switch structure pursuant to one of a plurality of scheduling modes, receiving a mode selection input, segregating the output queues into groups, assigning priority rankings to the groups, and applying one of the plurality of scheduling disciplines at each group of output queues as determined by the mode selection input and the priority rankings.

In a further aspect of the present invention: the groups of output queues include a group of per-Virtual Channel (VC) queues and at least one group of First In-First Out (FIFO) queues; the plurality of scheduling disciplines includes a Weighted Fair Queuing (WFQ) scheduling discipline applied by the controller at the group of per-VC queues and a Round Robin (RR) scheduling discipline applied by the controller at the at least one group of FIFO queues; the priority rankings including a highest priority ranking; and the group of per-VC queues being assigned the highest priority ranking.

In another aspect of the present invention, a chip set including a cell scheduler for a distributed shared memory switch architecture is disclosed.

DESCRIPTION OF THE DRAWINGS

Other objects, features and advantages of the invention will become readily apparent upon reference to the following detailed description when considered in conjunction with the accompanying drawings, in which like referenced numerals designate like parts throughout the figures thereof, and wherein:

FIG. 3 illustrates a migration path of scheduler operating modes from legacy switches without WFQ and per-VC queuing (stage 1) to full blown WFQ scheduling with per-VC queuing (stage 5)

DETAILED DESCRIPTION OF THE PREFERRED EMBODIMENTS

Figure 1:
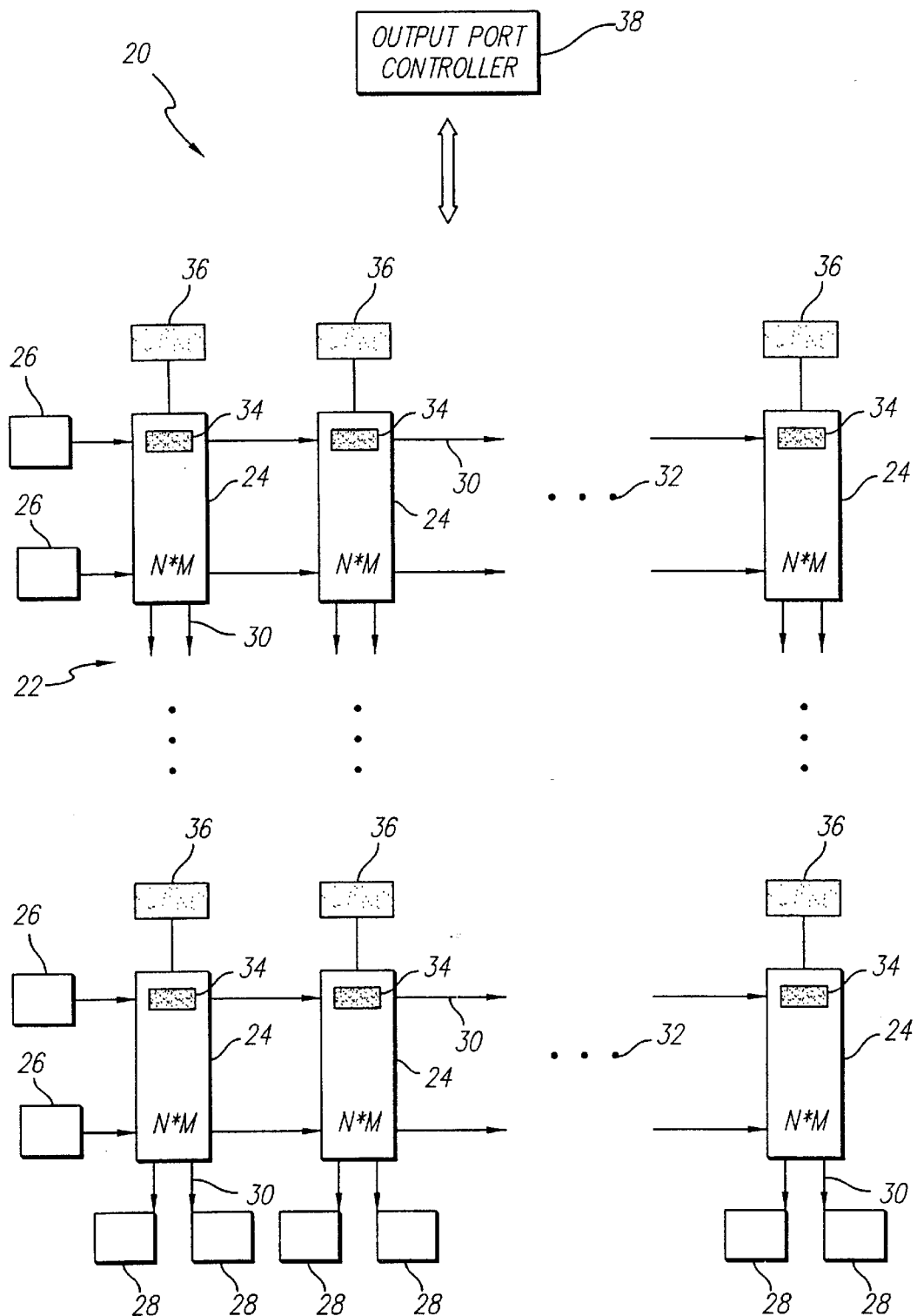
FIG. 1 is a block diagram of an exemplary preferred embodiment of a scheduler and switch architecture according to the present invention.

FIG. 1 is a block diagram of an exemplary preferred embodiment of a scheduler and switch architecture according to the present invention embodied in a chip set 20. The structure of the switch fabric 22 is shown in FIG. 1. The basic building block is a N*M shared memory module 24, where N>>M. Here N is the number of input ports 26 in a switch module, while M is the number of output ports 28. The modules 24 are connected to each other and to the input/output ports by means of high speed serial links 30. The values of N and M are restricted by the number of serial link cores that can be put on a single chip. For example, currently about 18 cores can be put on a chip, so that N=16, M=2 can be typical values to be used.

As in a distributed shared memory fabric, a cell 32 from an input module travels horizontally until it gets to the switch module 24 to which its output port 28 is attached. Hence cells 32 that are headed to a particular output are distributed along all the switch modules 24 in the column above that port. Based on the queue state information that it receives from these switch modules 24, the output port 28 then grants permission to one of the switch modules 24 to transmit a cell 32 during each time slot. The switch fabric 22 shown in FIG. 1 embodies the following improvements as compared to a traditional distributed shared memory switch fabric:

In a distributed shared memory fabric, typically N=M (vs N>>M in the switch fabric 22). In that situation, as the size of the switch increases, the number of switch modules X, that are incident on an output port increases as X=P/N, where P is the total number of ports in the switch. Typically, to keep memory costs down, N cannot exceed 4 in most distributed shared memory architectures, so that X=P/4. Hence, as P increases, more and more modules share the same column, and for X>8, centralized control of all of them from the output port becomes very difficult. This restricts the size of switch that can be built. On the other hand, in the switch fabric 22, the value of N can be much larger. It is easily possible to have N=16, with currently available memory and inter-connect technology, in which case X=P/16. As a result, the number of switch modules 24 along each vertical column is much smaller, thus simplifying control of each column and making bigger fabrics possible.

An additional feature of the switch architecture 22, as compared to the distributed shared memory fabric, is the presence of an hierarchical memory structure at each switch module. The hierarchical memory structure includes an on-chip high speed memory 34 that operates at the speed of N*S (where S is the speed of an input port) and a slower off-chip memory 36 that operates at a speed of (Y+M)*S. Here, Y is a number that is much smaller than N. For example, for the case when N=16 and M=2, Y can be 4. comparing these numbers to a 4*4 shared memory architecture, which required an off-chip memory of speed 8*S, the switch fabric 22 only requires an off-chip memory of speed 6*S. This reduction in memory speed is made possible by the construction of the switch fabric 22 which embodies a variation of the so-called knock-out principle. It is noted that the average rate of the traffic entering an N*M switch module 24 cannot exceed M*S if the network is operating in equilibrium. However, the instantaneous peak rate of the traffic entering that module 24 can be as much N*S, since there are N input ports incident upon it. These bursts at peak rate cannot last for very long, if the long term average of M*S is to be maintained. Hence, the fast on-chip buffer 34 of size B is provided to absorb these bursts. The buffer 34 is emptied to the larger off-chip buffer 36 of size C, at a rate Y*S. If the numbers M,N,B and Y are chosen properly, then a generalization of the knock-out principle asserts that the hierarchical two stage buffer operates like a single buffer of size (B+C) and speed (M+N)*S as far as the cell loss probabilities are concerned.

In a traditional distributed shared memory architecture where each module is of size N*N, one would require P*P/N*N modules to build a switch with P input/output ports. For example, to build a 40 Gbps switch with 2*2 modules, would require 1024 switch modules while with 4*4 modules the corresponding number is 256. On the other hand, if 16*2 modules constructed according to the switch architecture of the present invention are used, then the number of modules required is 128. This number may be further decreased by increasing the number of output ports per module. For example, 16*4 modules have the same memory speed requirement as 4*4 modules, and they need only 64 of these modules to get up to 40 Gbps. Hence, the switch architecture 22 realizes a considerable reduction in the number of switch modules as compared to the traditional distributed shared memory architecture.

The use of asymmetric N*M switch modules, with N>>M makes possible:
1. The use of a generalized knock-out principle to reduce memory speeds.
2. The reduction in column size which simplifies switch control.
3. The reduction in the number of switch modules to support a specified number of ports.

The switch architecture 22 retains all the advantages of shared memory/output queued architecture, such as, excellent support for traffic management and multicast, and at the same time makes possible much larger fabrics than is possible with those traditional approaches. These advantages are retained by slowing down the increase in memory speed with switch size, and also by reducing the vertical length of the fabric structure. As it becomes feasible to put more and more serial link cores on a single chip, it becomes possible to build larger and larger fabrics using the switch architecture 22 of the present invention.

In addition to the above advantages, the switch fabric 22 advantageously uses lower speed memories than a pure output buffered fabric. As compared to a pure input buffered fabric and multi-stage inter-connection network fabrics, the switch fabric 22 advantageously provides for less complex switch arbitration and better support for traffic management and multicast operations. Also, the switch fabric 22 is more scalable for comparable memory speeds than shared memory fabrics. In summary, the switch architecture 22 makes feasible the construction of very high speed switch fabrics using available technology. These switch fabrics are able to gain their speed without sacrificing other desirable features such as support for advanced traffic management or multicasting.

Figure 2:
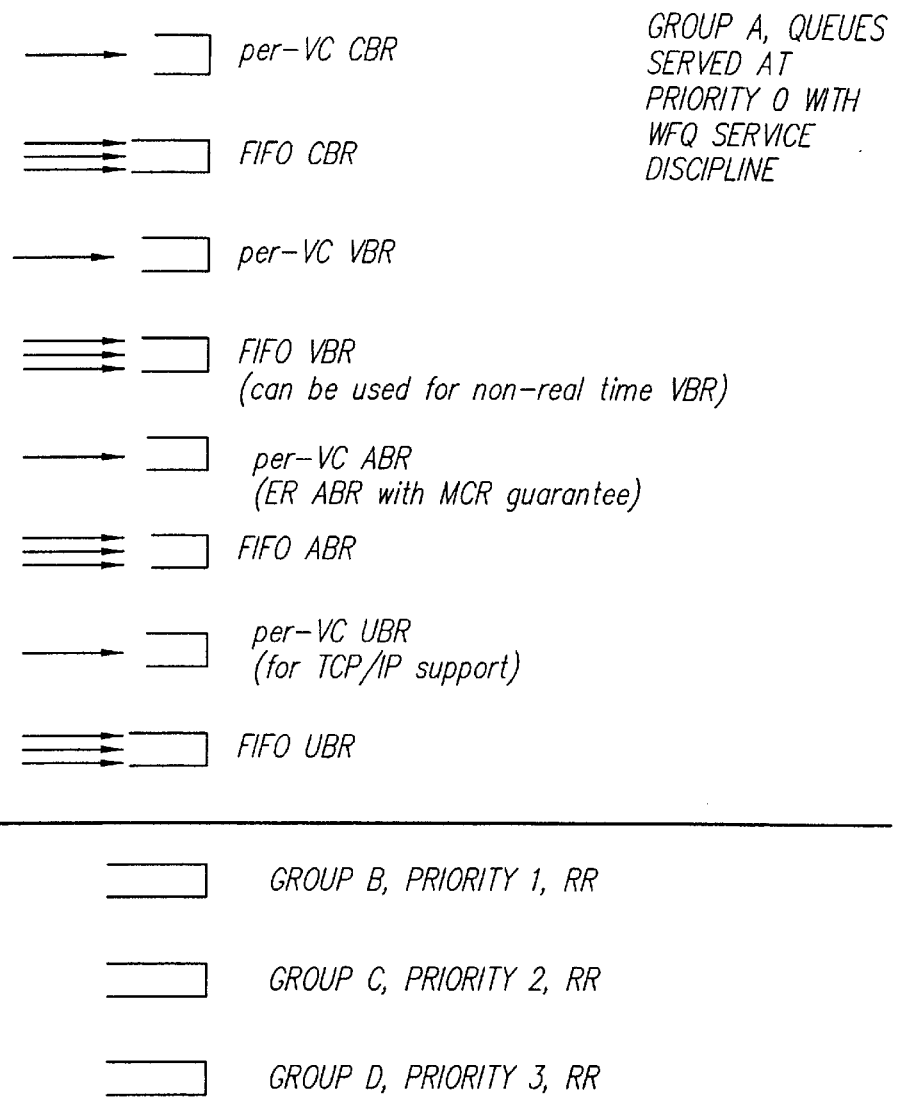
FIG. 2 is a high level functional diagram illustrating the output queuing scheduling discipline implemented by the scheduler of the present invention.

FIG. 2 is a high level functional diagram illustrating the output queuing scheduling discipline implemented by the scheduler of the present invention. The preferred scheduler is capable of supporting a plurality of different scheduling disciplines. As shown in FIG. 2, support for both WFQ and priority based scheduling are provided in the preferred exemplary embodiment. The subject matter of the present invention additionally contemplates a scheduler programmed to support other combinations of scheduling disciplines to meet the needs of future traffic management specifications and/or requirements.

The scheduler architecture illustrated in FIG. 2 is designed to provide a substantially seamless migration path from the present generation of switches, which only support FIFO queuing with strict priorities, to the next generation of switches which will support per-VC queuing with advanced scheduling. FIG. 3 illustrates a migration path of scheduler operating modes from legacy switches without WFQ and per-VC queuing (stage 1) to full blown WFQ scheduling with per-VC queuing (stage 5). The scheduler architecture accomplishes this by means of the following devices:

1. Each output queue can function as a per-VC queue OR it can multiplex several VCs together.
2. Output queues are divided into four groups A, B, C, D, such that all sub-queues in Group A are served according to the WFQ scheduling discipline, while the sub-queues in Groups B, C and D are served using the Round-Robin scheduling discipline. Moreover, the queues in Group A have higher priority than the queues in Group B, which in turn has higher priority than Group C, while Group D has the lowest priority.

The queuing structure shown in FIG. 2 is extremely flexible allowing the switch to progressively introduce more advanced traffic management while retaining the same queuing structure. The following exemplary rules may be used when choosing the group into which a VC should be placed:

1. If a VC requires explicit delay guarantees, then it should be placed in Group A, and it should not share its sub-queue with other VCs (this will be the case for CBR and real time VBR).
2. If a VC requires BW guarantees but no delay guarantees, then it should be placed in Group A, and it can share its sub-queue with other VCs with a similar requirement (this will be the case for non-real time VBR and ABR with MCR).
3. If a VC does not require either delay or BW guarantees, then it can go into Groups B, C or D. Sometimes, it may be required to serve multiple VCs in one of these groups with RR discipline (for example, for UBR). In that case, each VC should be given its own sub-queue.

The scheduler is implemented in a distributed shared memory switch architecture and physically resides in each output port controller 38 (FIG. 1). The scheduler implements the scheduling algorithm described above. The controller 38 maintains a table, which maps VC numbers of currently active VCs to the node in which the queue for that VC is to be found. The controller 38 is responsible for deciding which VC will be allowed to transmit during a cell slot and it then signals to the chosen VC which then forwards its cell onto the shared bus.

The objective of the priorities control is to ensure that the controller 38 grants transmission permits to higher priority VCs before it does so to lower priority VCs. As shown in FIG. 2, VCs within Transmission Priority 0 are served according to the WFQ discipline, while the VCs within Transmission Priorities 1, 2 and 3 are served according to the RR discipline. At each cell slot, each node sends a 4*M bit signal to the controller 38, to indicate whether there are any cells 32 available for transmission in each of the four priority groups, in each of the four links that it has cells 32 queued for. The controller 38 chooses the first priority group (starting from 0), which has a non-zero number of cells queued for transmission. The controller 38 implements RR within priorities as discussed below.

The controller 38 maintains a linked list of descriptors, representing all active queues within a priority class (for a given link). A queue may represent either a single VC (for the case of per VC queuing), or several VCs (for the case of FIFO queuing). When the time comes to serve a cell 32 from that priority class, the controller 38 chooses the queue whose descriptor is in front of the list. If the queue has no cell 32 to transmit, then its descriptor is removed from the list, and the next descriptor is chosen. If the queue does have a cell 32 to transmit, then its descriptor is re-attached to the back of the list. If a cell 32 arrives to an idle queue, then the node sends a signal to the controller 38, which then attaches the descriptor for that queue to the tail of the list.

For the case when every VC has its own queue, the controller 38 can identify the node in which a VC resides, once it knows the VC number. The controller 38 can then send a signal to that node to transmit a cell 32 from the chosen VC. A different situation exists when several VCs share the same queue since these VCs may be distributed over several nodes. A control structure addressing this situation is discussed below.

Figure 4:
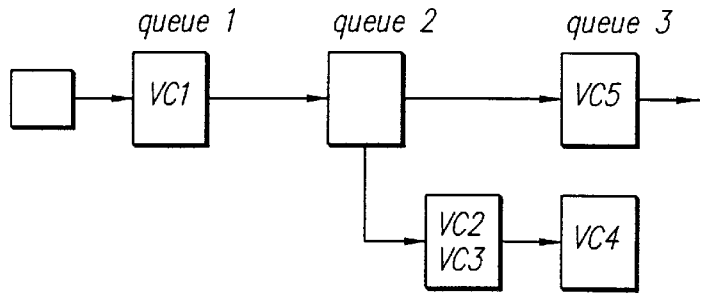
FIG. 4 is a block diagram illustrating how the scheduler effects cell transfers when several VCs share a common queue.

FIG. 4 is a block diagram illustrating how the scheduler effects cell transfers when several VCs share a common queue. In the illustrated exemplary control structure, queue 1 and queue 3 are per VC queues, while queue 2 is FIFO queue consisting of VCs 2, 3 and 4. VC2 and VC3 share a buffer at a node, while VC4 is on another node. Note that it is not possible to maintain strict FIFO for the cells in queue 2, since they are distributed over two nodes. In this case, the scheduler serves the common queue for VC2, 3 and during the next invocation of queue 2, it serves the queue for VC4. In order to avoid penalizing queues that have more VCs in them, the controller 38 preferably allocates slots to a queue in proportion to the number of VCs at that queue. In the above example, the controller 38 will allocate two slots to the queue with VC2,3 and one slot to the queue with VC4.

Significant to the WFQ within Priority 0, each node maintains the priority queue structure. An important aspect of the scheduler is the computation of a Potential Function P. Since the calculation of the Potential Function P requires the knowledge of the state in all of the nodes, it is performed by the controller 38.

Whenever P changes, its new value is communicated to each node by the controller 38. When a new cell arrives at a node, the node computes a Time Stamp (TS) value for that cell, utilizing P. If this is the first cell 32 in the queue, then this information is sent to the controller 38. If the cell 32 crosses a frame boundary, then this information is also sent to the controller 38. For each link, at each cell slot, each node selects the cell 32 with the smallest TS, and sends this value to the controller 38. It also informs the controller 38 whether the cell is marked. The controller 38 selects the node with the smallest TS, and signals it to transmit its cell 32. After transmission, the controller 38 updates the system potential and communicates the new value to all the nodes. An exemplary Potential Function P is discussed in an article entitled Traffic Scheduling System and Method for Packet-Switched Networks by Dimitrios Stiliadis and Anujan Varma; the subject matter disclosed in this article is incorporated herein.

The controller 38 also keeps account of the amount of BW that has been reserved on each link by WFQ based traffic. The remaining BW is then allocated to ABR and UBR traffic.

The cell scheduler advantageously incorporates several features not found in other scheduling schemes:
  Incorporation of both per-VC queuing as well as FIFO queuing.
  Incorporation of WFQ and RR scheduler.
  Option to segregate service classes by priority or by BW allocation.
  Support for Minimum Cell Rate guarantee for ABR traffic.
  Support for BW and delay guarantees.

The scheduler of the present invention supports a variety of scheduling schemes or disciplines, ranging from very simple priority scheduling to complex bandwidth partitioning based scheduling. As a result, the scheduler adds value to any ATM switch architecture that seeks to support the capabilities set forth in the ATM Forum Traffic Management 4.0 specification.

In conclusion, it is to be understood that the foregoing detailed description and the accompanying drawings illustrate the principles of the invention. However, various changes and modifications may be employed without departing from the spirit and scope of the invention. Thus, by way of example and not of limitation, the principles embodied in this invention can be applied in contexts other than in ATM, such as in the design of a Gigabit Ethernet switch. Accordingly, the present invention is not limited to the specific form shown in the drawings and described in detail hereinabove.

What is claimed is:

1. A cell scheduler for a distributed shared memory switch architecture, the cell scheduler comprising:

a controller for scheduling transmissions of cells from output queues of the switch architecture pursuant to one of a plurality of scheduling modes, receiving a mode selection input, segregating the output queues into groups of output queues, assigning priority rankings to the groups, and applying one of a plurality of scheduling disciplines at each of the groups as determined by the mode selection input and the priority rankings;

the group of output queues comprising a group of per-virtual-channel queues and at least one group of first-in-first-out queues;

the plurality of scheduling disciplines comprising a weighted-fair-queuing scheduling discipline applied by the controller at the group of per-virtual-channel queues and a round-robin scheduling discipline applied by the controller at the at least one group of first-in-first-out queues;

the priority rankings comprising a highest priority ranking; and the group of per-virtual-channel queues being assigned the highest priority ranking.

2. A cell scheduler for a distributed shared memory switch architecture, the cell scheduler comprising:

a controller for scheduling transmissions of cells from output queues of the switch architecture pursuant to one of a plurality of scheduling modes, receiving a mode selection input, segregating the output queues into groups of output queues, assigning priority rankings to the groups, and applying one of a plurality of scheduling disciplines at each of the groups as determined by the mode selection input and the priority rankings;

the groups of output queues including a group of per-virtual-channel queues; and the plurality of scheduling disciplines including a weighted-fair-queuing scheduling discipline applied by the controller at the group of per-virtual-channel queues.

3. The cell scheduler of claim 2 wherein the priority rankings comprise a highest priority ranking, and the group of per-virtual-channel queues are assigned the highest priority ranking.

4. A cell scheduler for a distributed shared memory switch architecture, the cell scheduler comprising:

a controller for scheduling transmissions of cells from output queues of the switch architecture pursuant to one of a plurality of scheduling modes, receiving a mode selection input, segregating the output queues into groups of output queues, assigning priority rankings to the groups, and applying one of a plurality of scheduling disciplines at each of the groups as determined by the mode selection input and the priority rankings;

the groups of output queues including a group of first-in-first-out queues; and the plurality of scheduling disciplines including a round-robin scheduling discipline applied by the controller at the group of first-in-first-out queues.

5. A cell scheduler for a distributed shared memory switch architecture, the cell scheduler comprising:

a controller for scheduling transmissions of cells from output queues of the switch architecture pursuant to one of a plurality of scheduling modes, receiving a mode selection input, segregating the output queues into groups of output queues, assigning priority rankings to the groups, and applying one of a plurality of scheduling disciplines at each of the groups as determined by the mode selection input and the priority rankings;

the groups of output queues including a group of per-virtual-channel queues; and the controller scheduling transmissions of cells from the per-virtual-channel queues such that a virtual channel associated with a particular cell does not share a sub-queue with another virtual channel.

6. A cell scheduler for a distributed shared memory switch architecture, the cell scheduler comprising:

a controller for scheduling transmissions of cells from output queues of the switch architecture pursuant to one of a plurality of scheduling modes, receiving a mode selection input, segregating the output queues into groups of output queues, assigning priority rankings to the groups, and applying one of a plurality of scheduling disciplines at each of the groups as determined by the mode selection input and the priority rankings;

the groups of output queues including a group of per-virtual-channel queues; and the controller scheduling transmissions of cells from the per-virtual-channel queues such that a virtual channel associated with a particular cell shares a sub-queue with another virtual channel.

7. A cell scheduler for a distributed shared memory switch architecture, the cell scheduler comprising:

a controller for scheduling transmissions of cells from output queues of the switch architecture pursuant to one of a plurality of scheduling modes, receiving a mode selection input, segregating the output queues into groups of output queues, assigning priority rankings to each groups, and applying one of a plurality of scheduling disciplines at each of the groups as determined by the mode selection input and the priority rankings;

the groups of output queues including a group of first-in-first-out queues; and the controller scheduling transmissions of cells from the first-in-first-out queues such that a virtual channel associated with a particular cell does not share a sub-queue with another virtual channel.

8. A cell scheduler for a distributed shared memory switch architecture, the cell scheduler comprising:

a controller for scheduling transmissions of cells from output queues of the switch architecture pursuant to one of a plurality of scheduling modes, receiving a mode selection input, segregating the output queues into groups of output queues, assigning priority rankings to the groups, and applying one of a plurality of scheduling disciplines at each of the groups as determined by the mode selection input and the priority rankings;

the groups of output queues including a group of first-in-first-out queues; and the controller scheduling transmissions of cells from the first-in-first-out queues such that a virtual channel associated with a particular cell shares a sub-queue with another virtual channel.

9. A cell scheduler for a distributed shared memory switch architecture, the cell scheduler comprising:

a controller for scheduling transmissions of cells from output queues of the switch architecture pursuant to one of a plurality of scheduling modes, receiving a mode selection input, segregating the output queues into groups of output queues, assigning priority rankings to the groups, and applying one of a plurality of scheduling disciplines at each of the groups as determined by the mode selection input and the priority rankings;

the groups of output queues including a group of per-virtual-channel queues and three groups of first-in-first-out queues; and the plurality of scheduling disciplines including a weighted-fair-queuing scheduling discipline applied by the controller at the group of per-virtual-channel queues and a round-robin scheduling discipline applied by the controller at the groups of first-in-first-out queues.

10. The cell scheduler of claim 9 wherein the priority rankings comprise a highest priority ranking, and the group of per-virtual-channel queues are assigned the highest priority ranking.

11. A chip set including a cell scheduler for a distributed shared memory switch architecture, the chip set comprising:

a plurality of output queues;

a controller for scheduling transmissions of cells from the output queues pursuant to one of a plurality of scheduling modes, receiving a mode selection input, segregating the output queues into groups of output queues, assigning priority rankings to the groups, and applying one of a plurality of scheduling disciplines at each of the groups as determined by the mode selection input and the priority rankings;

the groups of output queues including a group of per-virtual-channel queues; and the plurality of scheduling disciplines including a weighted-fair-queuing scheduling discipline applied by the controller at the group of per-virtual-channel queues.

12. The chip set of claim 11 wherein the priority rankings including a highest priority ranking, and the group of per-virtual-channel queues are assigned the highest priority ranking.

13. A chip set including a cell scheduler for a distributed shared memory switch architecture, the chip set comprising:

a plurality of output queues;

a controller for scheduling transmissions of cells from the output queues pursuant to one of a plurality of scheduling modes, receiving a mode selection input, segregating the output queues into groups of output queues, assigning priority rankings to the groups, and applying one of a plurality of scheduling disciplines at each of the groups as determined by the mode selection input and the priority rankings;

the groups of output queues including a group of first-in-first-out queues; and the plurality of scheduling disciplines including a round-robin scheduling discipline applied by the controller at the group of first-in-first-out queues.

14. A chip set including a cell scheduler for a distributed shared memory switch architecture, the chip set comprising:

a plurality of output queues;

a controller for scheduling transmissions of cells from the output queues pursuant to one of a plurality of scheduling modes, receiving a mode selection input, segregating the output queues into groups of output queues, assigning priority rankings to the groups, and applying one of a plurality of scheduling disciplines at each of the groups as determined by the mode selection input and the priority rankings;

the groups of output queues including a group of per-virtual-channel queues; and the controller scheduling transmissions of cells from the per-virtual-channel queues such that a virtual channel associated with a particular cell does not share a sub-queue with another virtual channel.

15. A chip set including a cell scheduler for a distributed shared memory switch architecture, the chip set comprising:

a plurality of output queues;

a controller for scheduling transmissions of cells from the output queues pursuant to one of a plurality of scheduling modes, receiving a mode selection input, segregating the output queues into groups of output queues, assigning priority rankings to the groups, and applying one of a plurality of scheduling disciplines at each of the groups as determined by the mode selection input and the priority rankings;

the groups of output queues including a group of per-virtual-channel queues; and the controller scheduling transmissions of cells from the per-virtual-channel queues such that a virtual channel associated with a particular cell shares a sub-queue with another virtual channel.

16. A chip set including a cell scheduler for a distributed shared memory switch architecture, the chip set comprising:

a plurality of output queues;

a controller for scheduling transmissions of cells from the output queues pursuant to one of a plurality of scheduling modes, receiving a mode selection input, segregating the output queues into groups of output queues, assigning priority rankings to the groups, and applying one of a plurality of scheduling disciplines at each of the groups as determined by the mode selection input and the priority rankings;

the groups of output queues including a group of first-in-first-out queues; and the controller scheduling transmissions of cells from the first-in-first-out queues such that a virtual channel associated with a particular cell does not share a sub-queue with another virtual channel.

17. A chip set including a cell scheduler for a distributed shared memory switch architecture, the chip set comprising:

a plurality of output queues;

a controller for scheduling transmissions of cells from the output queues pursuant to one of a plurality of scheduling modes, receiving a mode selection input, segregating the output queues into groups of output queues, assigning priority rankings to the groups, and applying one of a plurality of scheduling disciplines at each of the groups as determined by the mode selection input and the priority rankings;

the groups of output queues including a group of first-in-first-out queues; and the controller scheduling transmissions of cells from the first-in-first-out queues such that a virtual channel associated with a particular cell shares a sub-queue with another virtual channel.

18. A chip set including a cell scheduler for a distributed shared memory switch architecture, the chip set comprising:

a plurality of output queues;

a controller for scheduling transmissions of cells from the output queues pursuant to one of a plurality of scheduling modes, receiving a mode selection input, segregating the output queues into groups of output queues, assigning priority rankings to the groups, and applying one of a plurality of scheduling disciplines at each of the groups as determined by the mode selection input and the priority rankings;

the groups of output queues including a group of per-virtual-channel queues and three groups of first-in-first-out queues; and the plurality of scheduling disciplines including a weighted-fair-queuing scheduling discipline applied by the controller at the group of per-virtual-channel queues and a round-robin scheduling discipline applied by the controller at the groups of first-in-first-out queues.

19. The chip set of claim 18 wherein the priority rankings comprise a highest priority ranking, and the group of per-virtual-channel queues are assigned the highest priority ranking.

20. A method of manufacturing a cell scheduler for a distributed shared memory switch architecture, the method comprising the steps of:

(a) providing a controller for scheduling transmissions of cells from output queues of the switch architecture pursuant to one of a plurality of scheduling modes, including a weighted-fair-queuing scheduling discipline and a round-robin scheduling discipline;

(b) providing the controller with a mode selection input; and (c) employing the controller to segregate the output queues into groups, assign priority rankings to the groups, and apply one of the plurality of scheduling disciplines at each of the groups as determined by the mode selection input and the priority rankings.

21. A method of manufacturing a cell scheduler for a distributed shared memory switch architecture, the method comprising the steps of:

(a) providing a controller for scheduling transmissions of cells from output queues of the switch architecture pursuant to one of a plurality of scheduling modes;

(b) providing the controller with a mode selection input; and (c) employing the controller to segregate the output queues into groups including a group of per-virtual-channel queues and a group of first-in-first-out queues, assign priority rankings to the groups, and apply one of the plurality of scheduling disciplines at each of the groups as determined by the mode selection input and the priority rankings.

* * * * *